United States Patent Office 3,317,563
Patented May 2, 1967

3,317,563
PREPARATION OF ε-CAPROLACTONE
Theodore Horlenko and Donald R. Larkin, both of Corpus Christi, Tex., assignors to Celanese Corporation, a corporation of Delaware
No Drawing. Filed Dec. 26, 1963, Ser. No. 333,685
6 Claims. (Cl. 260—343)

This invention relates broadly to the preparation of lactones. More particularly it is concerned with the dehydrogenation of acyclic diols to lactones.

It is known that acyclic (including aliphatic) diols can be dehydrogenated in the liquid phase in an inert solvent, over a suitalbe catalyst, to the corresponding lactones. Heretofore this has been accomplished by using a powdered copper-chromium catalyst. The liquid-phase dehydrogenation of diols suffers from the disadvantage that the product is about 50% monomeric lactone and about 50% polymeric lactone. Since lactone polymers are generally not readily depolymerizable to the monomer, liquid-phase dehydrogenation is not a particularly desirable method of producing lactones from diols.

In contrast to the liquid-phase dehydrogenation of acyclic diols to lactones, the present invention comprises a vapor-phase dehydrogenation of such diols to lactones. The invention includes the vapor-phase dehydrogenation of acyclic diols such as α,ω-aliphatic diols having at least about 3 carbon atoms to ω-lactones having a corresponding number of carbon atoms; and, more particularly, the dehydrogenation of such aliphatic glycols having at least about 3 (preferably at least 4) carbon atoms, e.g., from 4 to about 7 or 8 or more carbon atoms, between the two hydroxyl groups to the corresponding lactones. The starting glycol reactant used in practicing this invention may additionally have branch or side chains of non-interfering groups such as, for example, alkyl or alkylene. More specific examples of such groups or chains are methyl through hexyl and higher radicals and methylene through hexylene and higher radicals. The alkylene chains are normally terminated by a straight- or branched-chain alkyl radical, but termination of the chain by an aryl, e.g., phenyl, or an alkaryl radical, e.g., tolyl, is not precluded.

It is not essential that the chain to which the hydroxy groups are attached be solely a hydrocarbon (unsubstituted hydrocarbon) chain. For example, the chain may be interrupted by other atoms such as, for instance, oxygen, sulfur or nitrogen atoms. In other words, the chain (including that portion of the chain between the hydroxyl groups) may be a heterogeneous chain and may contain such linkages as, for example, ether, thioether and tertiary-amino linkages.

Illustrative examples of acyclic diols that may be used as a starting reactant in practicing the present invention include the following:

1,4-butanediol
1,4-pentanediol
1,5-pentanediol
2,5-pentanediol
1,4-hexanediol
1,5-hexanediol
2,5-hexanediol
1,6-hexanediol
2,6-hexanediol
3,6-hexanediol
1,4-heptane through -decanediols
1,5-heptane through -decanediols
2,5-heptane through -decanediols
1,6-heptane through -decanediols
2,6-heptane through -decanediols
3,6-heptane through -decanediols
HO—CH$_2$CH$_2$CH$_2$—O—CH$_2$CH$_2$CH$_2$—OH
HO—CH$_2$CH$_2$CH$_2$—S—CH$_2$CH$_2$CH$_2$—OH
HO—CH$_2$CH$_2$CH$_2$—N(CH$_3$)—CH$_2$CH$_2$CH$_2$—OH
HO—CH$_2$CH$_2$CH$_2$CH$_2$CH(OH)—CH$_2$CH$_2$—O—CH$_2$CH$_2$—CH$_3$
HO—CH$_2$CH$_2$CH$_2$CH$_2$CH(OH)—CH$_2$CH$_2$CH$_2$—S—CH$_2$CH$_2$—CH$_3$ The process of the invention is generally carried out by vaporizing an appropriate glycol and bringing hydrogen and the glycol in the vapor phase into contact with a particular catalyst, namely, a catalyst comprising a material selected from the group consisting of (a) copper oxide and (b) copper oxide admixed (or combined) with uranium oxide. The oxides of (b) or a portion thereof may be in the form of, for example, copper uranate.

The hydrogen and the vaporized glycol may be passed in separate streams into a dehydrogenation zone or reactor containing the aforesaid catalyst and wherein the separate streams become admixed; or, advantageously, the vaporous glycol and the hydrogen may first be mixed together, and the mixed vapor stream then passed into the dehydrogenation zone where it contacts the copper-containing catalyst.

The contact material or catalyst may be in any suitable form. For example, the catalyst may take the form of pellets, tablets, spheres, capsules or particles of irregular shape. The copper oxide or copper oxide mixed (physically admixed or chemically combined) with uranium oxide (e.g., in weight proportions of about 10:90 to about 90:10) may be deposited on a suitable support, e.g., pumice, diatomaceous earth, kaolin, bauxite, the various synthetically-produced silicas and/or aluminas, and others known in the art. The catalyst may be used in the form of a fluidized bed.

In a preferred procedure the glycol is suitably vaporized at up to about 50° C. above its boiling point at atmospheric pressure; mixed with hydrogen in a mole ratio of about 1 to 5 to about 1 to 50; and the mixture fed into a dehydrogenation zone containing copper oxide, or copper oxide intimately associated with urmanium oxide, at a temperature above the boiling point of the glycol (e.g., about 175° to about 300° C. or higher depending upon the particular boiling point of the glycol employed), at a space velocity of about 250 to about 2000 per hour. The gaseous, crude reaction product, containing lactone, and unreacted glycol and hydrogen, is condensed and suitably separated into its component fractions either by partial condensation, distillation, extraction or other such techniques. Unreacted hydrogen and diol are suitably recycled, more particularly to the reaction zone, and the lactone product is collected.

In order that those skilled in the art may better understand how the present invention can be carried into effect, the following examples are given by way of illustration and not by way of limitation. All parts and percentages are by weight.

*Example 1*

1,6-hexanediol was vaporized at 295° C., mixed with hydrogen in a mole ratio of 35 of H to 1 of diol, and the mixture fed into a reactor containing 500 parts of a catalyst comprising copper oxide supported on pumice at atmospheric pressure. The reactor was maintained at 250° C. and 15 p.s.i.g. pressure. The space velocity of the vapor mixture was 1140 per hour. The reactor product was condensed at 10° C. to provide a 40% yield of ε-caprolactone at an efficiency of 91%. (By "efficiency" is meant the moles of lactone made per theoretical moles of lactone that could be made from the amount of diol consumed.) Such a high efficiency was unobvious and wholly unex-

Example 2

1,6-hexanediol was vaporized at 300° C., mixed with hydrogen in a mole ratio of 20 of H to 1 of diol, and the mixture fed into a reactor containing 500 parts of a catalyst comprising copper oxide-copper uranate on pumice at atmospheric pressure. The reactor was maintained at 250° C. and 15 p.s.i.g., and the space velocity of the vapor mixture was 580 per hour. The reactor product was condensed at 10° C. to provide a 50% yield of ε-caprolactone at an efficiency of 82%.

Following the same general technique described hereinbefore and illustrated by the specific examples, γ-butyrolactone was prepared from 1,4-butanediol. The same technique is applicable to the preparation of other lactones from other acyclic diols of the kind broadly defined hereinbefore as a starting material for practicing the present invention and of which numerous specific examples have been given.

It is to be understood that the foregoing detailed description is given merely by way of illustration and that many variations may be made therein without departing from the spirit of the invention.

The embodiments of the invention in which an exclusive property or privilege is claimed are defined as follows:

1. The process of making ε-caprolactone which comprises vaporizing 1,6-hexanediol at from about 250° C. to about 300° C.; mixing the vaporized diol with hydrogen; feeding the vaporous mixture of the said diol and hydrogen to a reaction zone wherein the said mixture is brought into contact with a catalyst consisting essentially of copper oxide; condensing the crude reaction product; and recovering ε-caprolactone from the condensate.

2. The process as in claim 1 wherein the mole ratio of hydrogen to 1,6-hexanediol fed to the reaction zone is from about 5 to 1 to about 50 to 1.

3. The process as in claim 1 wherein the unreacted hydrogen and 1,6-hexanediol in the crude reaction product are recycled to the said reaction zone.

4. The process of making ε-caprolactone which comprises vaporizing 1,6-hexanediol at from about 250° C. to about 300° C.; mixing the vaporized diol with hydrogen; feeding the vaporous mixture of the said diol and hydrogen at a space velocity of about 250 to about 2000 per hour to a reaction zone wherein the said mixture is brought into contact with a catalyst consisting essentially of copper oxide admixed or combined with uranium oxide, at a temperature of from about 175° C. to about 300° C.; condensing the crude reaction product; and recovering ε-caprolactone from the condensate.

5. The process as in claim 4 wherein the mole ratio of hydrogen to 1,6-hexanediol fed to the reaction zone is from about 5 to 1 to about 50 to 1.

6. The process as in claim 4 wherein the unreacted hydrogen and 1,6-hexanediol in the crude reaction product are recycled to the said reaction zone.

References Cited by the Examiner

UNITED STATES PATENTS

| | | | |
|---|---|---|---|
| 2,142,033 | 12/1938 | McNamee et al. | 260—340.2 |
| 2,178,761 | 11/1939 | Lazier | 260—343 |
| 3,073,822 | 1/1963 | Schultz et al. | 260—247.6 |
| 3,119,840 | 1/1964 | Mayhew et al. | 260—340.2 |

OTHER REFERENCES

Flory: Principles of Polymer Chem., Cornell Univ. Press, Ithaca, N.Y. (1953), page 99.

Marek et al.: The Catalytic Oxidation of Organic Compounds in the Vapor Phase, The Chemical Catalog Co., New York (1932), page 45.

WALTER A. MODANCE, *Primary Examiner.*

JAMES A. PATTEN, *Assistant Examiner.*